United States Patent
Beckett et al.

(10) Patent No.: US 10,595,098 B2
(45) Date of Patent: Mar. 17, 2020

(54) DERIVATIVE MEDIA CONTENT SYSTEMS AND METHODS

(71) Applicant: NBCUniversal Media, LLC, New York, NY (US)

(72) Inventors: William Beckett, Marlboro, NJ (US); Gaurav Gupta, Lodi, NJ (US); Milena Markova, Bergenfield, NJ (US)

(73) Assignee: NBCUniversal Media, LLC, New York, NY (US)

( * ) Notice: Subject to any disclaimer, the term of this patent is extended or adjusted under 35 U.S.C. 154(b) by 0 days.

(21) Appl. No.: 15/866,105

(22) Filed: Jan. 9, 2018

(65) Prior Publication Data

US 2019/0215579 A1    Jul. 11, 2019

(51) Int. Cl.
*H04N 21/845* (2011.01)
*G06F 17/27* (2006.01)
*H04N 21/81* (2011.01)
*H04N 21/8405* (2011.01)
*G06F 16/783* (2019.01)

(52) U.S. Cl.
CPC ......... *H04N 21/845* (2013.01); *G06F 16/783* (2019.01); *G06F 17/2785* (2013.01); *H04N 21/8126* (2013.01); *H04N 21/8405* (2013.01)

(58) Field of Classification Search
CPC .............. H04N 21/845; H04N 21/8126; H04N 21/8405; G06F 17/2785; G06F 17/30784
See application file for complete search history.

(56) References Cited

U.S. PATENT DOCUMENTS

| | | | |
|---|---|---|---|
| 8,331,739 B1 * | 12/2012 | Abdulkader | G06K 9/033 358/1.11 |
| 9,396,180 B1 * | 7/2016 | Salvador | H04N 21/233 |
| 9,652,534 B1 * | 5/2017 | Narayanan | G06F 16/951 |
| 9,846,696 B2 * | 12/2017 | Arngren | G06F 16/41 |
| 2006/0217979 A1 * | 9/2006 | Pahud | G06T 13/00 704/257 |
| 2007/0055695 A1 * | 3/2007 | Dorai | G06F 17/30787 |
| 2008/0098432 A1 * | 4/2008 | Hardacker | H04N 7/163 725/51 |
| 2008/0140385 A1 * | 6/2008 | Mahajan | G10L 15/18 704/9 |
| 2009/0009532 A1 * | 1/2009 | Hallberg | G06K 9/325 345/636 |
| 2009/0157697 A1 * | 6/2009 | Conway | G11B 27/00 |

(Continued)

*Primary Examiner* — Alexander Q Huerta
(74) *Attorney, Agent, or Firm* — Fletcher Yoder, P.C.

(57) ABSTRACT

A system for generating video clips includes a video processing system configured to receive computer vision (CV) output data, which includes optical character recognition (OCR) text of graphics from a video, time codes for the OCR text of the graphics, and ontology classifiers for the OCR text. The video processing system includes a file storage and database system configured to store the video, and to store the CV output data according to an ontology associated with the ontology classifiers. A CV moments module of the video processing system is configured to identify themes contained in the CV output data using the ontology classifiers, the ontology, and natural language processing (NLP), and to identify time codes associated with the identified themes. A video clip generator of the video processing system is configured to generate video clips of the video based on the identified time codes.

20 Claims, 10 Drawing Sheets

(56) References Cited

U.S. PATENT DOCUMENTS

| | | | |
|---|---|---|---|
| 2009/0327894 A1* | 12/2009 | Rakib | G11B 27/34 |
| | | | 715/719 |
| 2011/0209084 A1* | 8/2011 | Arav | G06Q 10/107 |
| | | | 715/780 |
| 2013/0036124 A1* | 2/2013 | Ambwani | G06F 17/30796 |
| | | | 707/749 |
| 2014/0046661 A1* | 2/2014 | Bruner | H04N 21/4884 |
| | | | 704/235 |
| 2014/0123178 A1* | 5/2014 | Burkitt | H04N 21/23424 |
| | | | 725/34 |
| 2014/0259056 A1* | 9/2014 | Grusd | H04N 21/8583 |
| | | | 725/34 |
| 2014/0328570 A1* | 11/2014 | Cheng | G11B 27/10 |
| | | | 386/241 |
| 2015/0050006 A1* | 2/2015 | Sipe | G06K 9/00711 |
| | | | 386/241 |
| 2015/0146984 A1* | 5/2015 | Brown | G06F 16/00 |
| | | | 382/182 |
| 2015/0234800 A1* | 8/2015 | Ehlen | G06F 16/70 |
| | | | 715/202 |
| 2017/0065888 A1* | 3/2017 | Cheng | A63F 13/497 |
| 2017/0228600 A1* | 8/2017 | Syed | G06K 9/00751 |
| 2018/0167698 A1* | 6/2018 | Mercer | H04N 21/8549 |

* cited by examiner

FIG. 13

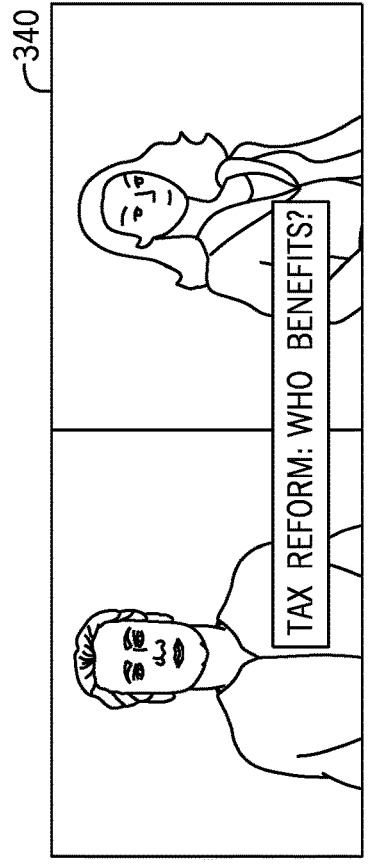

| | |
|---|---|
| DATE AIRED: | 20171218 |
| DURATION: | 02:59 MINS |
| DURATION (SECONDS): | 178.78 SECS |
| FFMPEG START: | 00:09:37.811 |
| FFMPEG END: | 00:12:36.590 |
| START SEC: | 577.81 |
| END SEC: | 756.59 |

| TEXT | TYPE | BASE ASSET ID | START TIME | END TIME |
|---|---|---|---|---|
| TAX REFORM: WHO BENEFITS? | LOWERCHANGE | 1819_20171218100000C | 00:09:37.811 | 00:09:53.633 |
| POLITICAN | VISUALTAGSTART | 1819_20171218100000C | 00:09:38.979 | 00:09:52.426 |
| PROFESSION | VISUALTAGSTART | 1819_20171218100000C | 00:09:38.979 | 00:09:52.426 |
| SPEECH | VISUALTAGSTART | 1819_20171218100000C | 00:09:38.979 | 00:09:52.426 |
| POLITICAN | VISUALTAGSTART | 1819_20171218100000C | 00:09:52.426 | 00:09:59.800 |
| SPEECH | VISUALTAGSTART | 1819_20171218100000C | 00:09:52.426 | 00:09:59.800 |
| PROFESSION | VISUALTAGSTART | 1819_20171218100000C | 00:09:52.426 | 00:09:59.800 |
| MAN | VISUALTAGSTART | 1819_20171218100000C | 00:09:52.426 | 00:09:59.800 |
| TAX REFORM: WHO BENEFITS? | LOWERSTART | 1819_20171218100000C | 00:10:00.000 | 00:10:15.749 |
| SPEND TEN YEARS AT THE HERITAGE FOUNDATION AS A FELLOW ANALYZING BUDGET AND TAX POLICY | QTRSTART | 1819_20171218100000C | 00:10:15.849 | 00:10:28.695 |
| JAMES PEN | QTRSTART | 1819_20171218100000C | 00:10:15.849 | 00:10:28.695 |
| STREETCRED | QTRSTART | 1819_20171218100000C | 00:10:15.849 | 00:10:28.629 |
| TAX REFORM: WHO BENEFITS? | LOWERCHANGE | 1819_20171218100000C | 00:10:16.049 | 00:10:16.049 |
| TAX REFORM: WHO BENEFITS? | LOWERCHANGE | 1819_20171218100000C | 00:12:17.738 | 00:12:17.728 |
| TAX REFORM: WHO BENEFITS? | LOWERCHANGE | 1819_20171218100000C | 00:12:17.738 | 00:12:36.590 |

DERIVATIVE MEDIA CONTENT SYSTEMS AND METHODS

BACKGROUND

The present disclosure relates generally to the generation of derivative video content, and more specifically, to systems and methods for automatically generating video clips from video content.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Media content, particularly media content delivered to media viewing devices such as televisions, computers, tablets, handheld devices, and so forth, typically includes both audio and video content. Different types of delivered media content have various ways of communicating a theme or relevant topic for viewers as the theme is being presented. A news transmission (e.g., broadcast), for example, includes coordinated audio and video content where a newscaster discusses the news of the day. To further enhance this and other types of content, certain media may also include graphical enhancements, such as scrolling text, symbols (e.g., stock symbols), or a graphical description of a theme being communicated during the presentation of the content. In the example of a news transmission, a graphic element relating to a topic may be shown on the video while the newscaster discusses news relating to the topic.

The presentation of the graphical enhancements may be coordinated and performed by a graphics operator, director, and technical director, based on the particular theme or topic being presented. Accordingly, there are specific processes involved, including human decision-making, that result in the coordinated presentation of on-screen graphics for the media content.

Certain types of media content, particularly certain types of shows, may include a number of topics or themes. For example, a typical newscast may include local news, national news, and international news topics. Content providers recognize that viewers do not always want to view media relating to all topics or themes in a given show. To address this, content providers may also provide derivative media content, such as segments of the show having a more focused set of themes. Referring again to the newscast example, a content provider may provide a video clip that is relatively short compared to the overall newscast and that is directed to a particular aspect of local news (e.g., recent results relating to a local sports team, a local weather forecast).

With ever-increasing amounts of media content produced, it has become more and more difficult to create sufficient amounts of derivative content on a consistent and rapid basis. Accordingly, a need exists for systems and methods for generating individualized, derivative media content in an efficient and rapid manner that is relevant to different users.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with an embodiment of the present disclosure, a method for generating video clips includes generating word groupings from a set of timecoded words corresponding to a video using natural language processing (NLP). The generating includes associating a theme with each word grouping based on a semantics model. The method further includes filtering the word groupings based on statistical relevance; identifying expressions having the filtered word groupings; grouping the expressions according to the theme of the word grouping associated with each expression; generating new time codes for clip generation by identifying correlations between the grouped expressions and the video; and generating a video clip using the new time codes.

In accordance with another embodiment of the present disclosure, a method for generating video clips, includes identifying seeding keywords from a keyword database within a set of timecoded words corresponding to a video; generating word groupings by identifying additional keywords from words surrounding the seeding keywords. Identifying the additional keywords includes using NLP to identify themes associated with the words surrounding the seeding keywords, and determining if the words surrounding the seeding keywords have a common theme with the seeding keywords. The method further includes determining a statistical relevance for each word grouping to identify statistically relevant word groupings; determining start timecodes and end timecodes for themes corresponding to the locations of the statistically relevant word groupings in the set of timecoded words; and generating a video clip based on the determined start timecodes and end timecodes for the themes.

In accordance with another embodiment of the present disclosure, a system for generating video clips includes a video processing system configured to receive a video file from a video capture system, and to create video clips based on significant moments identified in the video file. The video processing system includes a file storage and database system configured to store the video file, and storing an ontology and keywords associated with themes that are pertinent to the overall theme of the video file; and an NLP moments module configured to identify themes contained in the video file using the ontology and the keywords, and to identify time codes associated with the identified themes. The video processing system also includes a video clip generator configured to generate video clips based on the identified time codes.

In accordance with another embodiment of the present disclosure, a method for generating video clips includes receiving computer vision (CV) text data describing graphical elements of a video. The CV text data is timecoded. The method also includes calculating a frequency and a duration of terms within the timecoded CV text data; performing NLP on the timecoded CV text data to identify keywords and themes contained within the CV text data; determining which of the keywords and themes identified by the NLP are statistically relevant based on the calculated frequency, the calculated duration, or a combination thereof; selecting subsets of the CV text data based on the determined statistical relevance; and generating video clips based on the subsets of the CV text data.

In accordance with another embodiment of the present disclosure, a method for generating video clips includes receiving CV output data generated from a video comprising displayed symbols. The CV output data includes optical character recognition (OCR) text corresponding to symbols in the video, time codes for the OCR text, and ontology classifiers for the OCR text. The method also includes storing the CV output data in a database according to an ontology describing the CV output data using the ontology classifiers, finding and extracting OCR text corresponding to a specific symbol from the CV output data based on information located within the ontology using a regular expression parser, matching a text identifier from a database table with the extracted specific symbol, creating a CV-based object with time codes associated with the extracted OCR text in response to determining that the extracted specific symbol is valid based on the match. The method further includes creating a video clip based on the CV-based object.

In accordance with another embodiment of the present disclosure, a system for generating video clips includes a video processing system configured to receive CV output data generated by CV processing of a video. The CV output data includes OCR text of graphics from the video, time codes for the OCR text of the graphics, and ontology classifiers for the OCR text of the graphics. The video processing system includes a file storage and database system configured to store the video, and to store the CV output data according to an ontology associated with the ontology classifiers. The video processing system also includes a CV moments module configured to identify themes contained in the CV output data using the ontology classifiers, the ontology, and NLP, and to identify time codes associated with the identified themes. A video clip generator of the video processing system is configured to generate video clips of the video based on the identified time codes.

DRAWINGS

These and other features, aspects, and advantages of the present invention will become better understood when the following detailed description is read with reference to the accompanying drawings in which like characters represent like parts throughout the drawings, wherein.

Figure 1:
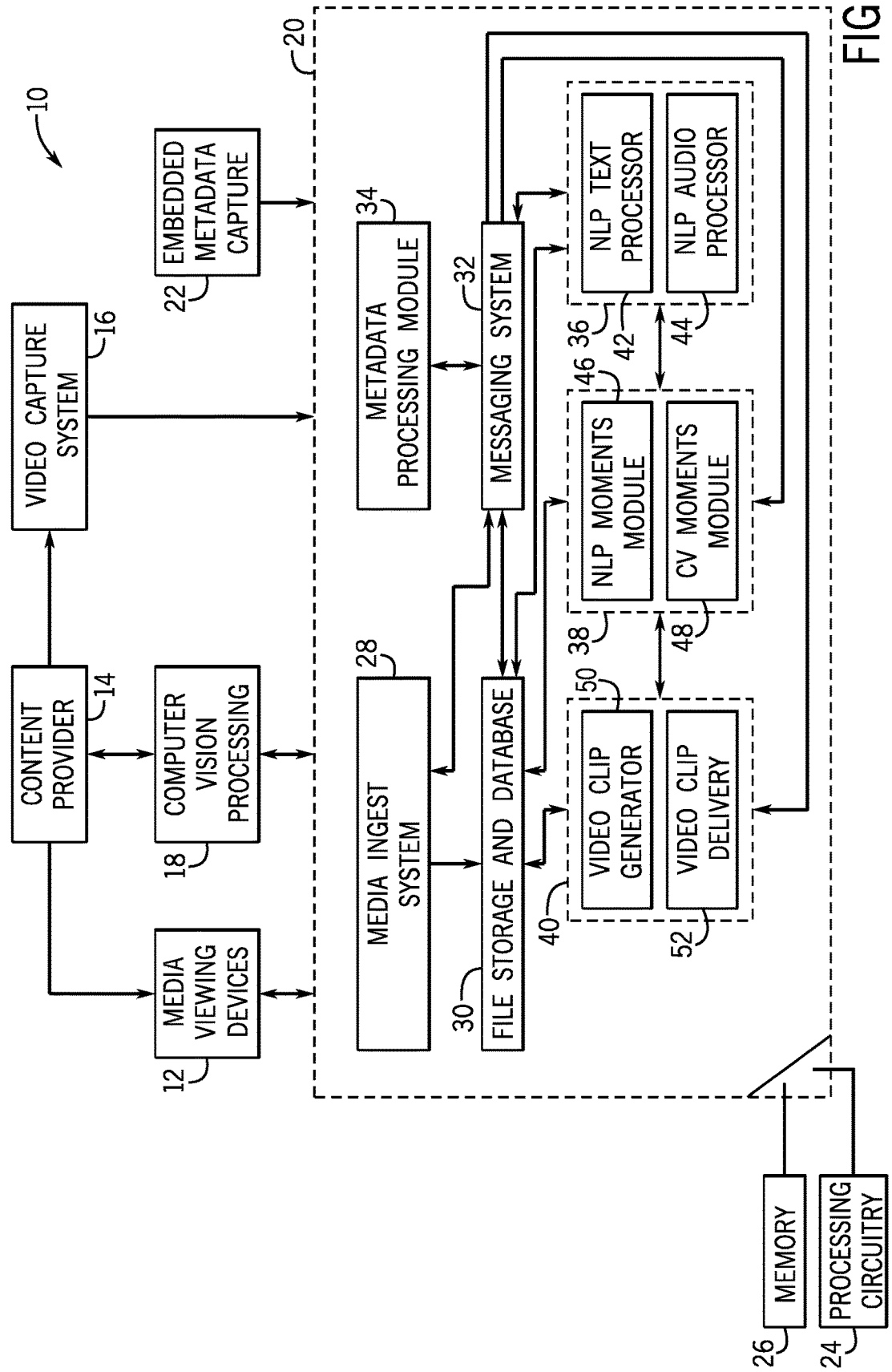
FIG. 1 is a schematic diagram of a content delivery system including a video processing system configured to produce derivative video content, in accordance with an embodiment of the present disclosure.
Figure 14:
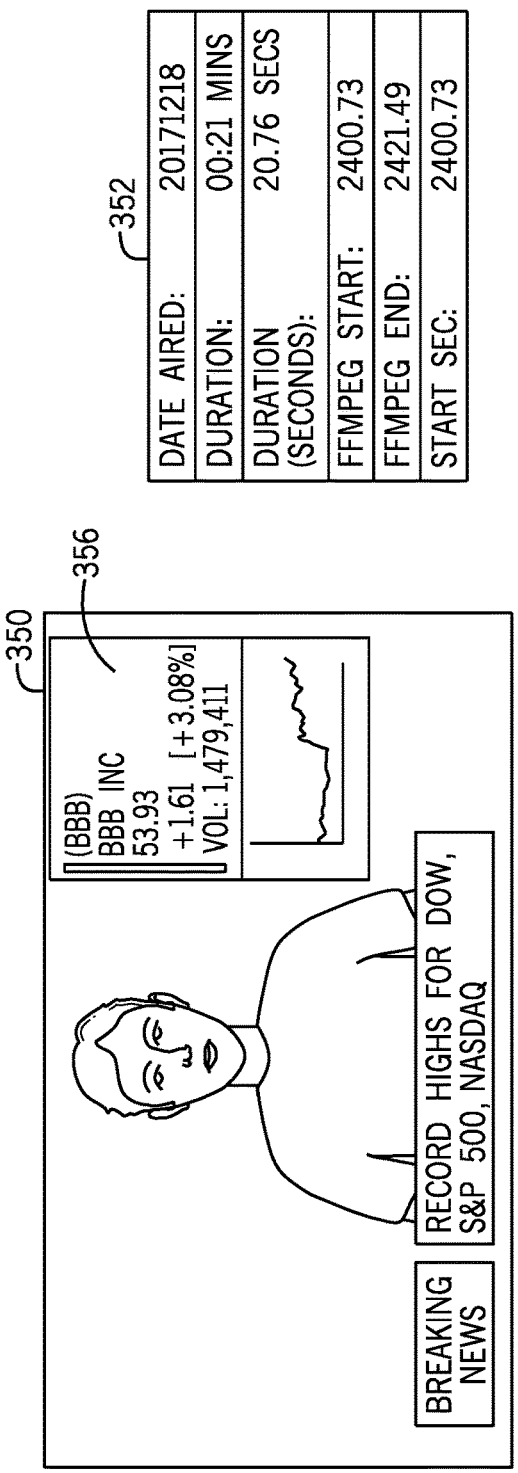

FIG. 13 is an example of a video clip generated by a CV moments module of the video processing system of FIG. 1, and data associated with the video clip, in accordance with an embodiment of the present disclosure; and FIG. 14 is another example of a video clip generated by the CV moments module of the video processing system of FIG. 1, and data associated with the video clip, in accordance with an embodiment of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As set forth above, it is now recognized that traditional computer-based approaches to derivative media content generation are often unable to identify where themes and topics develop within a particular media (e.g., a video). The present disclosure provides, among other things, systems and methods for automatically generating derivative content in an efficient and accurate manner. By way of non-limiting example, the present disclosure includes systems and methods that use NLP to identify times where certain themes develop within a video. In certain embodiments, the NLP may be performed on text generated from audio associated with the video, and/or on text data generated from CV processing of the video.

While various aspects of the present disclosure may be implemented in a wide variety of systems, FIG. 1 illustrates an embodiment of a media content delivery system 10 configured to deliver media content and derivative media content to various media viewing devices 12. The media viewing devices 12 may include a television set, a collection of components including a television set, a computer with monitor, an audio-only playback system, a hand-held device, a smart phone, or any other media device to which digital content is delivered and used by a user or a target audience. The media viewing devices 12 will generally include a monitor or another display device configured to provide still or moving pictures based on the received content. In an aspect, the media viewing devices 12 may be configured to provide audio output based on the received content.

As illustrated, content (e.g., media including video and audio) may be provided (e.g., transmitted) by a content provider 14 and delivered to various media viewing devices 12. As an example, the content provider 14 may include content distribution systems configured to transmit digital content (or analog content that may be later digitized) to a target audience. The content providers 14, by way of example, may include television broadcast companies, cable providers, satellite programming providers, Internet-based content providers, radio stations, or any other providers of digital content or analog content. Moreover, a range of technologies may be used for delivering the content to the media viewing devices 12, such as cable or fiber optic links for cable television, Internet communications, and so forth, broadcast technologies, satellite transmission technology, cellular technologies, various wireless technologies, and so forth.

It is also recognized that the media viewing devices 12 may receive the content from a wide range of other components. These components may include stored content sources, such as disk readers, solid state memory, cloud computing services, third-party storage and/or playback systems, and so forth. In general, all of these sources may be capable of providing the content that is played by the media viewing devices 12.

In accordance with an aspect of the present disclosure, the media content produced by the content provider 14 may be captured by a video capture system 16. Specifically, the video capture system 16 is illustrated as communicatively coupled to the content provider 14 so as to enable the video capture system 16 to access the media content. The video capture system 16 may include a series of components or systems that enable access, reception, and recording of the media content provided by the content provider 14. By way of non-limiting example, the video capture system 16 may include one or more computing devices having appropriate storage capabilities, such as a series of storage drives configured to digitally store the media content. Additionally or alternatively, the video capture system 16 may be implemented as one or more computing devices that are associated with remote storage systems, and may have appropriate cataloging capabilities so as to access the stored media content at a later time.

In accordance with another aspect of the present disclosure, the content provider 14 may provide media content to a CV processing system 18, which is in turn communicatively coupled to a video processing system 20 configured to generate derivative media content in accordance with the present disclosure. However, as described below, the CV processing system 18 will typically access the media content from the video processing system 20.

The illustrated video processing system 20 is also communicatively coupled to the video capture system 16, and includes various features configured to perform the media content derivatization techniques described herein. In addition, the video processing system 20 may be communicatively coupled to the media viewing devices 12 to enable delivery of derivative media content. Communication between the video capture system 16 and the video processing system 20 may enable the video processing system 20 to receive digital copies of the media content generated by the content provider 14. Accordingly, the video processing system 20 may include appropriate computer-based systems having hardware and software components that are specifically configured to retrieve digital content (e.g., video files) from the video capture system 16. Such hardware and software components may include input/output hardware and content retrieval software that enables interfacing with the video capture system 16 (e.g., over the Internet or a local network), access to the captured digital content, and retrieval of the same. Other components of the video processing system 20 are described below.

In a similar manner, the video processing system 20 may also be communicatively coupled to an embedded metadata capture system 22, which is configured to produce metadata associated with media content generated by the content provider 14. By way of non-limiting example, the embedded metadata may include closed caption text associated with the media content (e.g., a video file) provided by the content provider 14. The metadata provided by the embedded metadata capture system 22 may be used by the video processing system 20 in combination with other types of data generated to perform certain of media content derivatization processes described herein.

In accordance with embodiments of the present disclosure, the video processing system 20 may be implemented in a number of ways. However, the video processing system 20 may generally include one or more computing devices having processing circuitry 24, which may include one or more processors, and associated memory circuitry 26, which may include various types of machine-readable storage devices having code or other stored instructions (e.g., algorithms, processes, software packages). The processing circuitry 24 and associated memory circuitry 26 are generally intended to denote the collective processing and memory circuitry of the video processing system 20, which may be distributed across a number of computing devices that are communicatively coupled to one another. Generally, the processing circuitry 24 carries out instructions stored on the memory circuitry 26 to perform the content derivatization techniques described herein. As described below, portions of the memory circuitry 26 may include hardware and/or software modules that perform specific content derivatization processes.

The memory circuitry 26 may also store information relating to the media content provided by the content provider 14, as well as digital copies of the media content. Again, while the processing circuitry 24 and the memory circuitry 26 are schematically illustrated as single units, portions of the video processing system 20 may be implemented as a number of different devices having all or a portion of the processing circuitry 24 and the memory circuitry 26. As an example, the video processing system 20 may be implemented as one or more computer systems that are networked together to enable the transmission of files and the coordination the various processes described herein. In one particular embodiment, for example, various modules may be implemented as hardware that may be integrated with a computer system, the modules having corresponding and appropriately programmed processing circuitry and memory circuitry representing part of the processing circuitry 24 and the memory circuitry 26. Additionally or alternatively, certain of the modules described herein may be implemented as software packages stored on the memory 26, and which may be used to perform content derivatization by the processing circuitry 24 in response to various commands generated by other portions of the video processing system 20. Further details regarding the modules and the associated communication are described below.

In the illustrated embodiment, the video processing system 20 includes a media ingest system 28, which is configured to receive digital copies the media content from the video capture system 16, and to store the digital copies in a file storage and database system 30 in a particular manner. The media ingest system 28 is also communicatively coupled to a messaging system 32, which is configured to coordinate various operations by subsystems of the video processing system 20. In accordance with the illustrated embodiment, this may include notifying various subsystems associated with the video processing system 20 that the media ingest system 28 has stored and catalogued digital copies the media content for further processing.

The file storage and database system 30 may be implemented as one or a combination of file storage and cataloging systems, including computing devices having appropriate storage and cataloging capabilities. In accordance with an aspect of the present disclosure, the file storage and database system 30 may store digital copies of the media content and databases relating to the type of media content being stored. For example, the file storage and database system 30 may include a database of various keywords associated with themes that are anticipated to be associated with the media content, as well as an ontology that provides contextual information regarding terms (e.g., the keywords), themes, and topics that may be relevant to the media content. The ontologies contained within the file storage and database system 30 may be accessed and updated by one or a combination of the processes described herein to enable content derivatization to be implemented in an increasingly efficient and accurate manner. More particularly, in certain embodiments, the keyword database and/or ontology stored in the file storage and database system 30 maybe accessed and updated to enable machine learning techniques to be performed. This is generally intended to enhance the functioning of various computer devices associated with the video processing system 20 that perform media content derivatization.

The file storage and database system 30 and the messaging system 32 may be communicatively coupled to a number of subsystems the video processing system 20 to enable the messaging system 32 to coordinate retrieval and processing of digital copies of media content stored in the file storage and database system 30. Further, the messaging system 32 may coordinate the generation and storage of video clips, as well as the delivery of video clips to the media viewing devices 12. The illustrated example of the video processing system 20 also includes a metadata processing module 34, which is communicatively coupled to the messaging system 32 to enable processing and delivery of the embedded metadata generated by the embedded metadata capture system 22. The file storage and database system 30 and the messaging system 32 are also communicatively coupled to an NLP processing subsystem 36, a significant moments processing subsystem 38, and a video clip production and delivery subsystem 40.

The NLP processing subsystem 36 is illustrated as including an NLP text processor 42 and the NLP audio processor 44. The NLP text processor 42 may be implemented as a standalone computing device, or as a module associated with a larger computing device having one or more of the other subsystems of the video processing system 20. The NLP audio processor 44 may be similarly configured. The NLP text processor 42 is generally configured to identify correlations between themes, meanings, and text associated with the media content provided by the content provider 14. This may be accomplished by the NLP text processor 42 using, for example, a semantic model. The semantic model may utilize various keywords and the ontology (a particular ontology that is appropriate for the type of media content), which may be stored in the file storage and database system 30. The NLP audio processor 44 is configured to convert speech associated with the media content to text in accordance with a particular type of language model, such as a domain specific language model.

The NLP processing subsystem 36 is shown as being in communication with the significant moments subsystem 38, which may include an NLP moments module 46 and a CV moments module 48. In general, the NLP moments module 46 is configured to identify themes contained in text associated with the media content (e.g., video file) using an ontology appropriate for the particular type of media being processed (e.g., a show about the weather versus a show about stocks). The NLP moments module 46 may also be configured to identify significant moments within the media based on the themes, and time codes, which are time points in the time frame of the video, associated with the significant moments. In accordance with the present embodiments, these identified time codes may in turn be used by the video clip production and delivery subsystem 40 to produce video clips that are based on significant moments relating to common themes.

The CV moments module 48 is generally configured to identify themes and significant moments based on these themes contained in CV output data produced by the computer vision processing system 18. The CV moments module 48 uses an appropriate ontology, as well as outputs from one or both of the NLP text processor 42 and NLP audio processor 44, to perform such processing. The CV moments module 48 is also configured to identify time codes associated with significant moments, and these time codes may be used by the video clip production and delivery system 40 to generate video clips.

As may be appreciated, the subsystems of the video processing system 20 carry out a number of functions including retrieval, storage, cataloging, and processing of the media content provided by the content provider 14. Accordingly, the messaging system 32 of the present disclosure includes specific programming to manage and coordinate these various functions. For example, the messaging system 32 may be configured to coordinate retrieval, storage, and cataloging of the media content by the media ingest system 28, retrieval and processing of the audio associated with the media content by the NLP moments module 46 and generation of video clips by a video clip generator 50 of the video clip production and delivery subsystem 40. In certain situations, the messaging system 32 may also coordinate delivery of derivative content to the meeting viewing devices 12 using a video clip delivery module 52.

Further, in certain embodiments, the messaging system 32 may be configured to coordinate CV processing of the media by the computer vision processing system 18, retrieval and processing of CV output data by the CV moments module 48, processing of text and/or audio by the NLP text processor 42 or the NLP audio processor 44, and so forth. The particular manner in which these functions are coordinated by the messaging system 32 may depend at least in part on the nature of the media content being processed, as well as the particular technique being used to generate video clips. Described below are certain of the techniques that may be used by the video processing system 20 as well as the manner in which processes and information are coordinated between the various subsystems of the video processing system 20.

Figure 2:
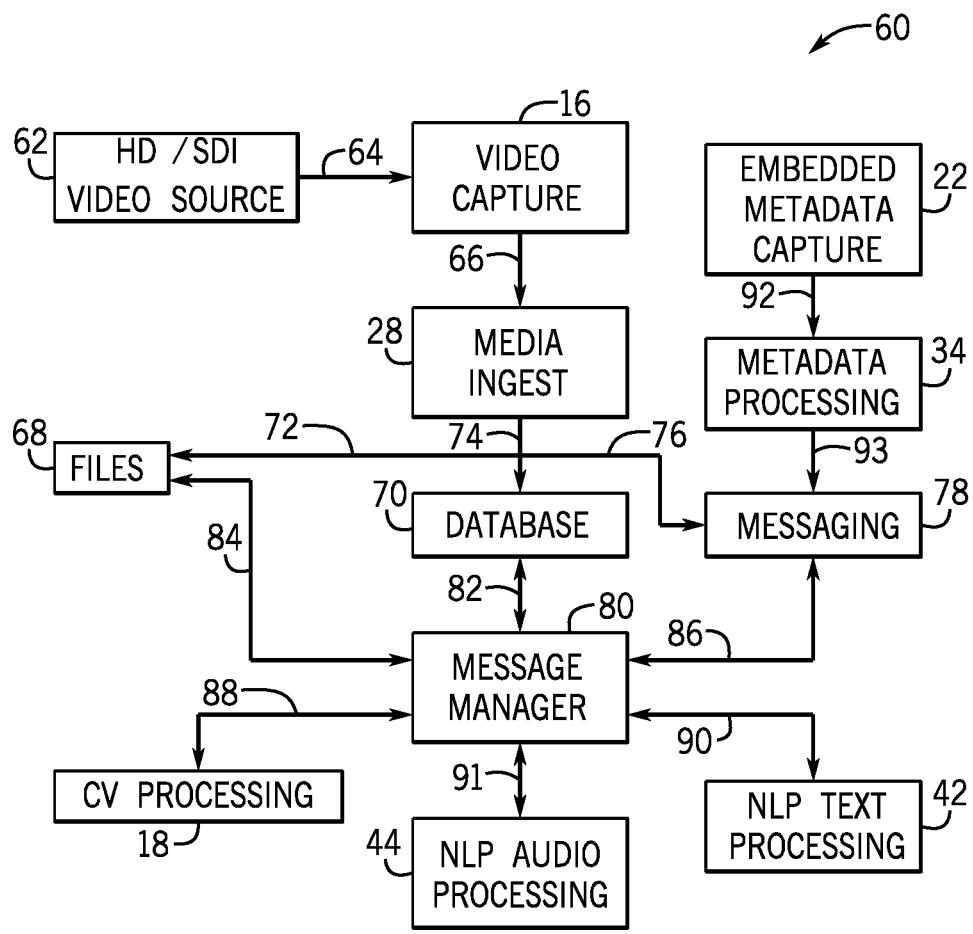
FIG. 2 is a process flow diagram illustrating the manner in which the system of FIG. 1 may process media using CV, NLP, or a combination thereof to generate derivative video content, in accordance with an embodiment of the present disclosure.

FIG. 2 is a process flow diagram illustrating the manner in which the media content delivery system 10 processes media content using CV, NLP, or a combination thereof to generate derivative video content. In particular, process 60 may begin at the video source 62 (e.g., a video source supporting a high-definition serial digital interface), which may correspond to a particular type of content provider 14. As an example, the video source 62 may be a source of video that results in the generation of video files, which may be container files having both video and audio components. As shown in the process 60, video from the video source 62 is captured by video capture system 16 at operation 64. This generates a captured asset (e.g., a video file).

The video capture system 16 is communicatively coupled to the media ingest system 28, and the process 60 may include a captured asset ingest process beginning at operation 66. As set forth above, the media ingest system 28 is communicatively coupled to the file storage and database system 30 and the messaging system 32. In the embodiment illustrated in FIG. 2, the media ingest system 28 is coupled to a file storage portion 68 and a database portion 70 of the file storage and database system 30. At operation 72, the video file is introduced into the storage system 68 and named. At operation 74, the captured asset (file) is catalogued in the database 70. The cataloging that occurs at operation 74 may be performed according to an ontology, which may have general descriptors associated with the video file. For instance, the general descriptors may include a list of keywords and themes associated with the type of content contained in the video file.

The media ingest system 28 is also communicatively coupled to the messaging system 32, and at operation 76, a message is generated indicating that storage and cataloging is complete. In particular, a messaging module 78 of the messaging system 32 may process and generate particular types of messages to be sent to and received from other subsystems of the video processing system 20.

A message manager 80 of the messaging system 32 is shown as being in communication with the file storage and database system 30, the messaging module 78, CV processing system 18, the NLP audio processor 44, and the NLP text processor 42. As shown, at operation 82, the message manager 80 processes a message indicating that the asset is complete. At operation 84, the message manager 80 causes the asset (e.g., the video file) to be copied to various storage devices in the file storage 68 for individual retrieval and processing by the CV processing system 18, the NLP audio processor 44, and the NLP text processor 42. At operation 86, a message is generated and processed to indicate that the storage is complete. At this point, processing may be initiated by any one or combination of the CV processing system 18, the NLP audio processor 44, and the NLP text processor 42.

Referring to FIG. 2, at operation 88, the message manager 80 may transmit a message that computer vision processes may begin on an instance of the stored asset. Similar start messages may be transmitted at steps 90 and 91 that NLP text processing and NLP audio processing, respectively, may be initiated on separate instances of the stored asset. As described below, the result of this processing may enable the generation of derivative video content according to the techniques of the present disclosure.

The process 60 also describes the processing of metadata relating to the captured asset. In the illustrated embodiment, for example, the process 60 includes the transmission of embedded metadata (e.g., closed caption text) from the embedded metadata capture system 22 to the metadata processing module 34 at operation 92, and the transmission of a message to the messaging module 78 that the embedded metadata processing is complete at operation 93. Although FIG. 2 provides a series of operations and processes, the process flow of FIG. 2 neither requires nor implies that every processes described with respect to FIG. 2 is required to be performed.

Figure 3:
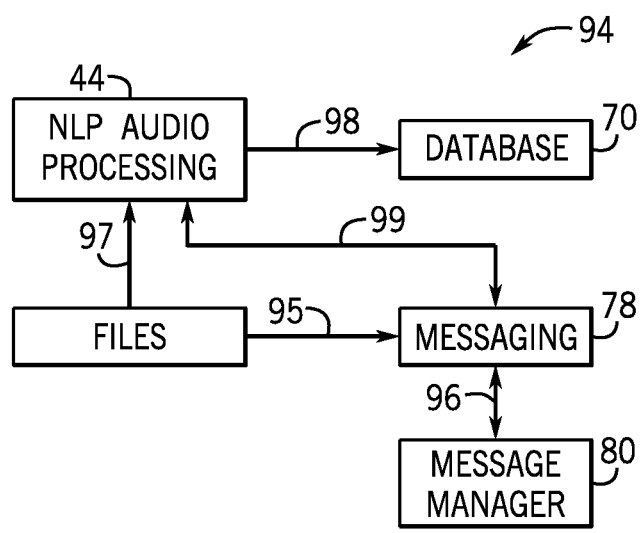
FIG. 3 is a process flow diagram depicting a method associated with NLP audio processing of audio from a video file to generate timecoded words for subsequent processing, in accordance with an embodiment of the present disclosure.

FIG. 3 depicts a process 94 associated with NLP audio processing 44 of a video file to generate timecoded words for subsequent processing in accordance with the techniques described herein. Specifically, the timecoded words correspond to speech within audio associated with the video file. Accordingly, the techniques described herein may use the timecoded words to identify where themes develop in the speech from the video, and use those times for eventual derivative video clip generation.

Process 94 describes a series of example operations (e.g., including messaging and information flow) that occur during the natural language processing techniques used in the present disclosure. For instance, there is a file asset complete message transmitted at operation 95 when the messaging module 78 obtains information (e.g., from file storage 68) indicating that initial file asset processing (e.g., storage and cataloging) has been completed.

A communication at operation 96 between messaging 78 and the message manager 80 indicates that the NLP audio processing manager is starting. At operation 97, to begin audio processing, the NLP audio processing 44 retrieves, for example, an instance of a video file having an audio component. This retrieval may be considered an indication that audio processing is starting.

As noted, NLP audio processing 44 performs operations on audio associated with the video to convert speech to text based on domain specific language models. The output of the audio processing 44, therefore, includes timecoded words (e.g., including keywords), which are then added to the database 70 at operation 98. At operation 99, a communication between the NLP audio processing 44 and messaging 78 indicates that NLP audio processing 44 is complete.

Figure 4:
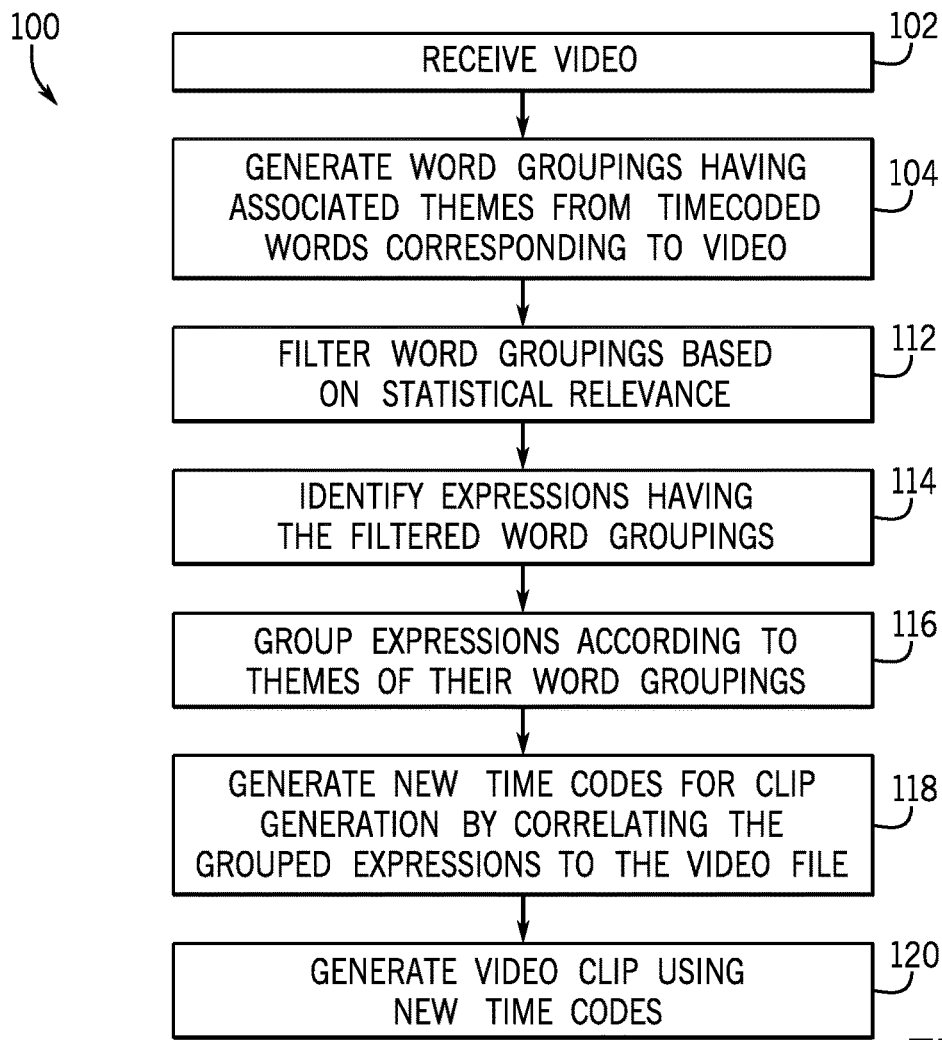
FIG. 4 is a process flow diagram illustrating a method for generating video clips using text generated from NLP audio processing, in accordance with an embodiment of the present disclosure.

One example embodiment of a method 100 for generating video clips using text generated from NLP audio processing is depicted as a process flow diagram in FIG. 4. As illustrated, the method 100 includes accessing the video upon which the video clip generation process is performed. At operation 102, the video may be accessed by any one or combination of the subsystems of the video processing system 20 configured to access the video from the file storage and database system 30.

At operation 104, the video may be further processed by generating word groupings from a set of timecoded words corresponding to audio associated with the video using natural language processing. In an aspect, word groupings may correspond to sentence fragments. The timecoded words corresponding to the video may be produced by the NLP audio processor 44 or combination of the embedded metadata capture system 22 and the metadata processing module 34. In an aspect, the NLP text processor 42 may generate the word groupings according to a process in which a theme is associated with each word grouping based on a semantics model. In accordance with the present embodiments, the semantics model may use a vocabulary, which is a set of definitions corresponding to certain words, and an ontology, which describes the terms in a contextual manner and thereby resolves which particular definition of the term to use based on context. Accordingly, the NLP text processor 42 is able to determine when themes develop within certain sections of the text.

Figure 5:
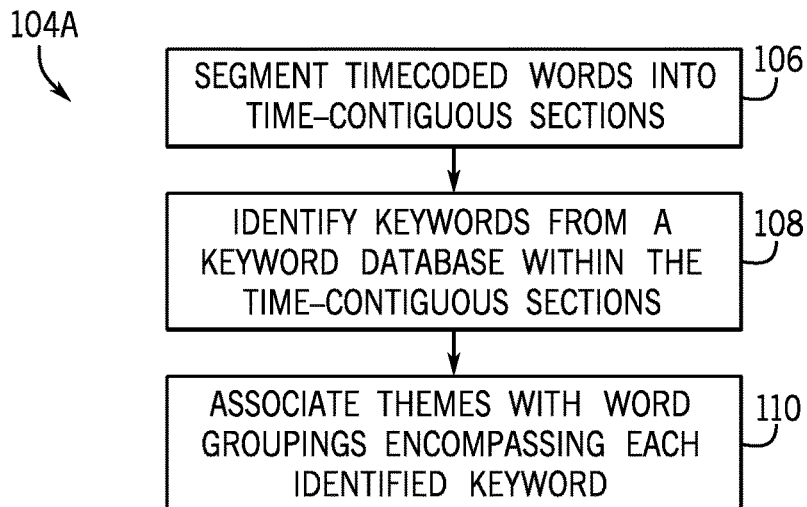
FIG. 5 is a process flow diagram of a process for generating the word groupings in accordance the method of FIG. 4, in accordance with an embodiment of the present disclosure.

Turning briefly to FIG. 5, an example embodiment of a process 104A for generating the word groupings in accordance with operation 104 is shown as a process flow diagram. The process 104A includes segmenting, at operation 106, the timecoded words into time-contiguous sections, which may be useful for determining whether certain terms, word groupings, themes, and so forth, are statistically relevant. A word grouping may be considered statistically relevant when the word grouping exhibits a frequency above a frequency threshold and/or a duration above a duration threshold.

Once the timecoded words have been segmented into the time continuous sections at operation 108, keywords may be identified within the time contiguous sections, where the keywords are identified based on keywords contained in a keyword database. The keyword database may be located in the file storage and database system 30. In certain embodiments, identifying keywords in accordance with operation 108 may include identifying time codes associated with those words and subsequently performing processing relative to those time codes to identify themes. The identified themes are then associated at operation 110 with word groupings that encompass the identified keywords.

Returning now to FIG. 4 and method 100, the method 100 further includes filtering, at operation 112, the generated word groupings based on their statistical relevance. This filtering may be performed by a process in which a frequency and a duration associated with the word groupings is determined, followed by determining whether the frequency and the duration associated with the word groupings are within predetermined ranges. In this way, statistically relevant word groupings are identified, which generally correspond to significant moments in the video.

Determining the frequency and the duration of the word groupings, in certain embodiments, may include determining the frequency that certain keywords from the word groupings are present within a certain timeframe (e.g., 15 seconds). This is one reason why it may be beneficial to segment the overall text corresponding to the video into segments, so that the calculated frequencies corresponding to the keywords may be meaningful. Calculating a duration of the word grouping many include calculating or identifying a time length between when the word grouping begins and the word grouping ends according to the timeframe of the video. The word grouping may begin at the first appearance of the word grouping and may end at the last appearance of the word grouping within the timeframe of the video.

At operation 114, the method 100 continues with identifying expressions that include the filtered word groupings. The expressions may correspond to a phrase or one or more sentences having the word groupings. Further, it is recognized that groups of words may span multiple sentences, phrases, and so forth. In accordance with the acts represented by operation 114, identifying the expressions may include identifying time codes associated with the beginning and the end of sentences corresponding to the expressions. For instance, natural pauses in spoken language may be represented in text by punctuation marks. In this respect, the system can identify such punctuation marks and determine that the beginning and the end of the expression are associated with particular punctuation marks to identify time code locations of the expressions.

At operation 116, the method 100 continues with grouping expressions according to the themes of their word groups. Grouping the expressions in accordance with operation 116 may include generating correlations between different start and end time codes within the timeframe of the video. For example, expressions that are associated with a common theme (or a similar theme) may be grouped together for purposes of determining start and end time codes within the timeframe of the video. Accordingly, the expressions do not necessarily need to be contiguous in time according to the timeframe of the video in order to be grouped together.

Once the expressions are grouped, new time codes may be generated at operation 118 by correlating the group expressions to time points in the video as noted above. This may include determining valid timecode boundaries for a video clip, for example by validating time codes generated at operation 114 against closed caption text associated with the video. As illustrated, the method 100 includes generating, at operation 120, the video clip using the new time codes generated at operation 118.

Figure 6:
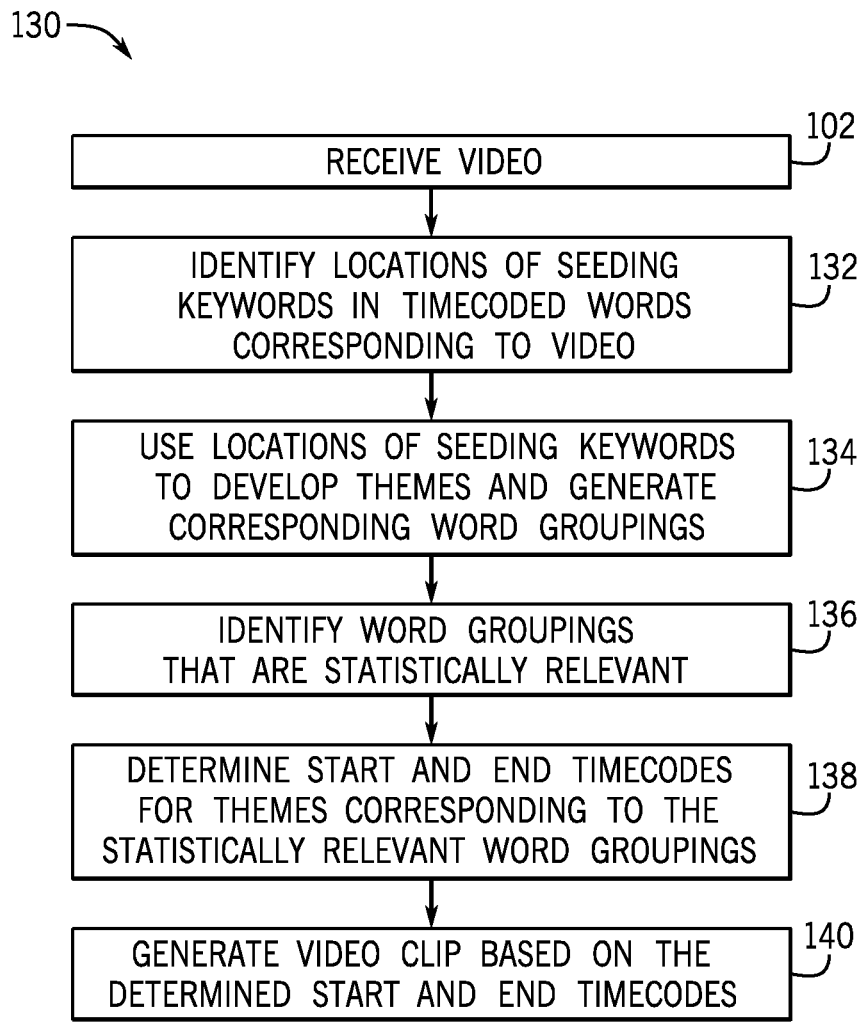
FIG. 6 is a process flow diagram of a method of using keyword seeding to enhance identification of where themes develop in a video to generate video clips, in accordance with an embodiment of the present disclosure.

In accordance with another embodiment of the present disclosure, NLP processing of information associated with the video may include keyword seeding to enhance identification of where themes develop in the video. An example embodiment of such a method 130 is depicted in FIG. 6 as a process flow diagram. The method includes accessing video in generally the same manner as described above with respect to operation 102 in FIG. 4. Once the video is accessed, further processing is performed based on timecoded words corresponding to the video. As set forth above, such timecoded words may be generated from an NLP audio processing of the audio associated with the video, or may be timecoded caption text, or a combination thereof.

At operation 132, locations of seeding keywords (e.g., from a timecode perspective within the timeframe the video) in the timecoded words corresponding to the video are identified. The seeding keywords may be keywords from a keyword database associated with the file storage and database system 30. The seeding keywords may generally relate to a known theme that is associated with a more general theme of the video.

The locations of the seeding keywords may be used, at operation 134, to develop themes and generate corresponding word groupings. Operation 134 may include several sub-processes. As an example, generating the word groupings may include identifying additional keywords from words that surround the seeding keywords in time based on the time frame of the video. Words that surround the seeding keywords in time may be located adjacent to the seeding keywords or approximately adjacent to the seeding keywords. These word groupings may be generated (or identified) using natural language processing, and themes may be identified for each generated word grouping. Operation 134 may include determining whether the word groupings have a common theme with the seeding keywords.

Determining whether the theme is common with the seeding keywords may be performed according to the ontology that is associated with the file storage and database system 30. In accordance with certain embodiments, the additional keywords that are located within the timecoded words corresponding to the video may be used to update the keyword database and in some instances, the ontology. In this respect, the additional keywords in essence become seeding keywords themselves which may be further associated with surrounding words. Thus, generating the word groupings may include grouping words with the seeding keywords and the additional keywords in response to determining that the words have a common theme with the seeding keywords and the additional keywords.

Further, if another theme is identified in a time between the words in the seeding keywords according to the timeframe of video, the words are not grouped with the seeding keywords. In other words, the time contiguous section corresponding to a theme cannot be generated because an additional, non-common theme has been identified between the locations of the words having corresponding themes.

The method 130, as set forth above, is used to generate video clips based on themes. Accordingly, it may be useful to determine which word groupings and accordingly, which themes, are statistically relevant (e.g., significant). As such, the method 130 includes identifying word groupings that are statistically relevant at operation 136. Identifying which word groups are statistically relevant may be performed by calculating the frequency and/or duration associated with the word groupings. The frequency and duration calculation may generally correspond to or include similar or the same techniques as those employed at operation 112 of FIG. 4. For example, determining the statistical relevance of the word groupings may include determining the frequency and duration of the word groupings, and determining whether the frequency and duration of the word groupings are both within predetermined frequency ranges and duration ranges. Additionally or alternatively, determining the statistical relevance of the word groupings may include determining a frequency and duration of a theme associated with the word groupings, and determining whether the frequency and the duration of the theme are both within predetermined frequency ranges and duration ranges.

To facilitate video clip generation, the method 130 also includes determining, at operation 138, start and end time codes for themes corresponding to the statistically relevant word groups. The start and end time codes may be determined by identifying, in some embodiments, the beginning of an expression containing the respective word grouping. The expression, as generally described above, may include a phrase or one or more sentences. A timecode associated with the beginning of the expression may be located, and may be used as a starting point for a video clip. A similar process may be used to determine the end timecode for the expression. For instance, to determine the end timecode, the beginning of an expression associated with a different theme may be identified and the timecode associated with that beginning may be used as the end time code for the video clip generation. Additionally or alternatively, identifying the beginning of the expression may include locating a punctuation mark occurring immediately prior to the statistically relevant work grouping, and using the punctuation mark as the location of the timecode associated with the beginning of the expression, i.e., the start time code for the theme. Using the start and end time codes, the method 130 then calls for generation of a video clip based on the determined start and end time codes at operation 140.

Figure 7:
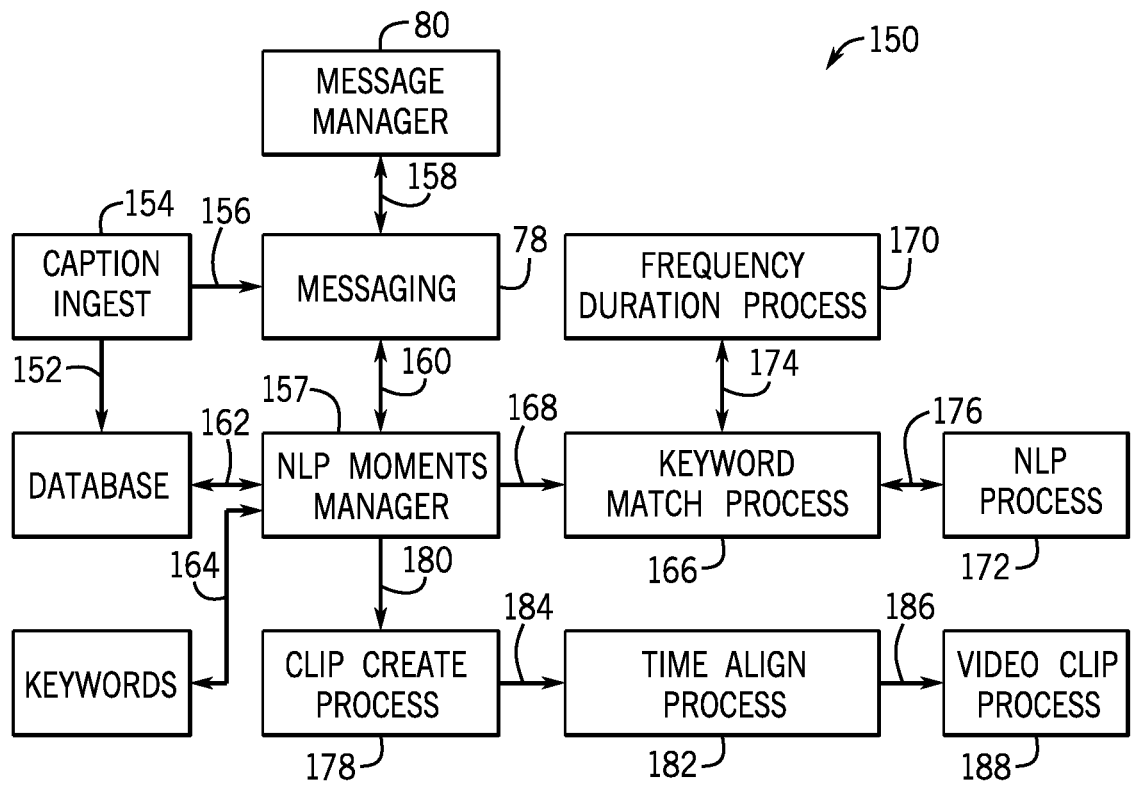
FIG. 7 is a process flow diagram corresponding to a specific embodiment of an NLP moments process for generating video clips relating to significant moments of a video, in accordance with an embodiment of the present disclosure.

As set forth above, the video processing system 20 includes a significant moments processing subsystem 38 having the NLP moments module configured to perform the processes described above. FIG. 7 is a process flow diagram corresponding to a specific embodiment of an NLP moments process 150 for generating video clips relating to significant moments of a video. As shown in operation 152, the process 150 includes entering embedded metadata or timecoded text into the database 70 via caption ingest process module 98 (e.g., implemented as one or combination of stored algorithms of the metadata processing module). A closed caption complete message is then transmitted at operation 156 to the messaging module 78. The messaging module and the message manager 80, which are in communication, then generate an indication that an NLP moments manager 157 (e.g., implemented as one or combination of stored algorithms of the NLP moments module 46) is beginning at operation 158. At operation160, the NLP moments manager 157 is initiated.

At operation 162, the NLP moments manager 157 obtains timecoded caption data from the database 70. At operation 164, the NLP moments manager 157 may obtain keywords which may be in the database 70. A keyword match process 166 is then initiated at operation 168 to identify where keywords are located in the timecoded text data. After the keyword match process 166 is initiated at operation 168 by the NLP moments manager 157, a frequency and duration process 170 and an NLP process 172 are initiated at operations 174 and 176, respectively. It should be noted that the outputs from the frequency and duration process 170 and the NLP process 172 may be shared, and that these processes may be performed iteratively. For example, the NLP process 172 may be used to identify sentences and sentence fragments, or more generically, expressions and word groupings, having common themes with keywords identified in the keyword match process 166.

The frequency and duration process 170 may operate to identify the frequency of occurrence keywords, while the duration calculated may be associated with the sentences, sentence fragments, expressions, or word groupings, and so forth, having the matched keywords. Accordingly, it should be appreciated that the processes 170 and 172 performed may not necessarily be linear but may instead be interwoven. Furthermore, in certain embodiments, the NLP moments manager 157 may identify additional keywords key phrases or other similar expressions to update the database 70.

A clip creation process 178 is initiated at operation 180, and the clip creation process determines valid timecode boundaries for video clips based on identified statistically relevant word groupings or expressions. As noted, the statistically relevant expressions or word groupings may be identified using a combination of the keyword match process 166, the frequency and duration process 170, and the NLP process 172. Once the valid timecode boundaries are determined by the clip creation process 178, a time align process 182 is initiated at operation 184. In the time align process 182, caption phrases are time aligned to the video. Based on this time alignment, new time codes are generated. These new time codes are used in operation 186 by a video clip process 188 to generate video clips.

Figure 8:
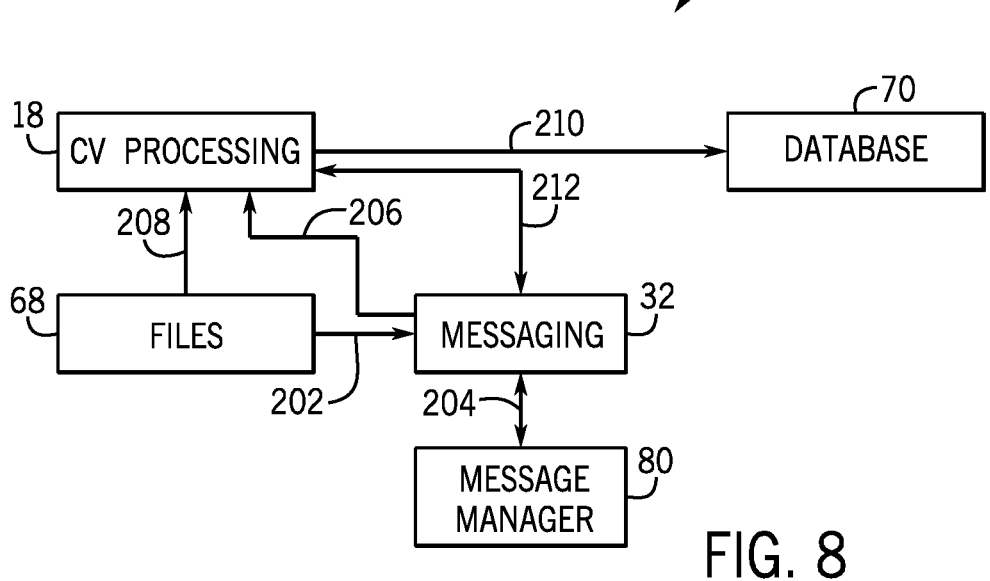
FIG. 8 is a process flow diagram including a series of coordinated communications and information flow relating to CV processing of the video file to produce CV output data, in accordance with an embodiment of the present disclosure.

As discussed above with respect to FIGS. 1 and 2, the present disclosure includes approaches to generating video content using natural language processing either alone or in combination with computer vision processing. Because certain of the present techniques utilize output data from NLP processes and CV processes, it may be useful to describe an example process associated with the manner in which CV processing of a video file is coordinated. To help illustrate, FIG. 8 is a process 200 illustrated as a flow diagram including a series of coordinated communications and information flow relating to CV processing of the video file to produce CV output data. The CV output data is the data that is operated upon by the techniques described herein so that significant moments can be discovered from graphical elements presented in a video.

As shown, the process 200 includes a message 202 that the file asset (e.g., the video file) has been stored in files storage 68 and catalogued appropriately. A message to begin a CV processing manager of the message manager 80 is transmitted at operation 204. The messaging module 32 then transmits a communication 206 to the CV processing system 18 indicating that the captured asset (e.g., video file) is ready for retrieval and processing. The CV processing system 18 retrieves the video asset file from file storage 68 at operation 208.

The CV processing system 18 then performs computer vision processing on the video asset file to produce CV output data. As an example, the CV processing system 18 may process the video asset file to identify on-screen elements, such as graphical elements, that are presented to enhance the presentation of a theme associated with all or a portion of the video. As described herein, the CV processing system 18 processes the video asset file according to a defined ontology, which may also be retrieved by the CV processing system 18 when retrieving the video asset file. The use of the ontology may be desirable to enhance processing accuracy by the CV processing system 18, and thereby facilitate the identification of themes that are particularly relevant to the type of video being processed.

Once the CV output data is generated, it is added to the database 70 at operation 210. A process complete message is transmitted at operation 212 to messaging module 32 indicating that CV processing has been completed and that the results of been added to the database. This may also signal to the messaging module 32 that the processes that utilize the CV output data may begin.

Figure 9:
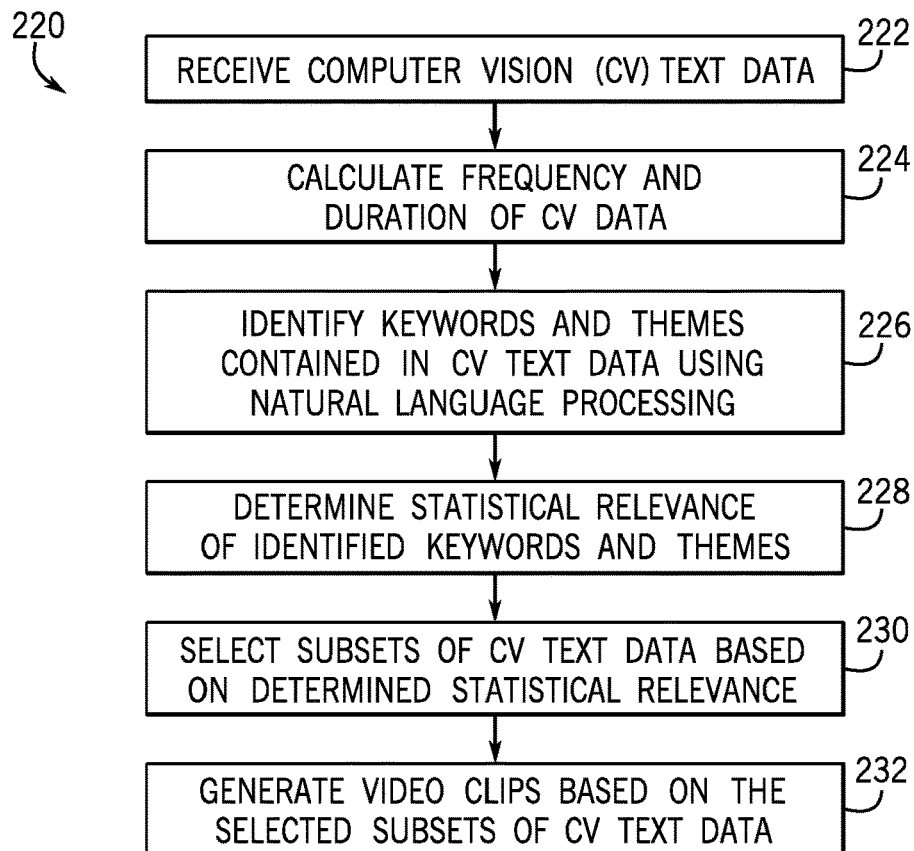
FIG. 9 is a process flow diagram depicting a method for generating video clips using a CV moments module of the video processing system, in accordance with an embodiment of the present disclosure.

One example of such a process is illustrated in FIG. 9 as a process flow diagram depicting a method 220 for generating video clips using, for example, CV moments module 48 of the video processing system 20. As illustrated, the method 220 includes receiving, at operation 222, CV text data. More specifically, the CV text data describes graphical elements of a video and is timecoded according to the time frame of the video. In certain embodiments, the timecoded CV text data includes OCR text of on-screen graphics of the video, timecodes associated with the OCR text and an ontology which describes the CV text data in a generalized manner. As generally discussed above, the ontology particularly provides contextual information relating to the CV text so that the meaning of certain terms is better understood. This may be particularly useful in machine learning applications so that automated identification of thematic elements in a video can be more accurately identified.

The CV text data may also describe aspects of the graphical elements presented in the video. For example, the CV text data may note the time at which a particular graphical element appears in the video and the time at which the graphical element no longer appears in the video. The data may also describe a location of the graphical element (e.g., the top, bottom, left, right, lower one third, or similar position) as displayed (e.g., an "on-screen" location). Further, in some embodiments, the acts represented by operation 222 may include receiving the CV text data from a CV processing system after the CV system has processed the video according to a defined ontology. The defined ontology may be transmitted to the CV system along with the video file being processed to enable the CV system to identify particularly relevant graphical elements while ignoring or deemphasizing graphical elements that are not in accordance with the defined ontology.

Once the CV text data is obtained, the CV text data may be subjected to various processes including the frequency and duration process at operation 224, where the frequency and duration terms within the CV text data are determined. The frequency that is calculated for the CV text data may be, for example, the frequency that a particular text representation of a graphical element appears over a certain time. The duration of a particular graphical element or a text representation thereof, may represent the duration that the graphical element appears in the video in any one instance. Alternatively or additionally, the duration that is calculated may be an average duration of several instances that the particular text representation of the graphic element appears.

The method 220 also includes identifying, at operation 226, keywords and themes contained in the CV text data using NLP. In particular, in one embodiment, the NLP used according to operation 226 may be NLP text processing. The identification of key words and themes contained in the CV text data may be performed in a similar manner as described with respect to FIGS. 4, 5, and 6. For example, keywords may be identified in the CV text data by searching a keyword database associated with the particular type the video that is being processed. Identification of the themes contained in the CV text data may be accomplished by associating the identified keywords with themes according to a defined ontology as described above.

Statistical relevance of identified keywords may be determined at operation 228 according to an output of the frequency and/or duration information. For example, a keyword may be considered statistically relevant if it occurs in the CV text data at a frequency over a certain time of the video. For example, if a particular keyword as mentioned several times over the span of two minutes of video, it may be considered to be statistically relevant. Further, a theme may be considered statistically relevant in a similar manner. However, a duration of the theme may be considered more pertinent information regarding its relevance. For example, if an identified theme has a very short duration (e.g., a second or two), the theme may not be considered statistically relevant. On the other hand, if the theme is found to have a duration that lasts for several seconds then the theme may be considered more statistically relevant and is likely to be associated with a significant moment presented in the video.

Once statistical relevance has been determined in accordance with operation 228, the method 220 selects subsets of CV text data based on the determined statistical relevance in accordance with operation 230. The acts represented by operation 230 may include identifying respective correlations of the statistically relevant keywords and themes, subsets of the CV text data that have frequency and duration within a predetermined range, or other words determined to have been statistically relevant. In addition to performing the acts represented by operation 230, the method 220 may include providing machine learning feedback to the computer vision system that generates the CV text data, for instance in situations where certain keywords and themes were incorrectly identified or OCR text does not have an appropriate correspondence to a keyword. In this regard, the machine learning feedback may include information relating to incorrect CV text data, CV text data that is not statistically relevant, or any combination thereof.

Once subsets of the CV text data have been selected, video clips may be generated in accordance with operation 232. Certain embodiments, generating the video clips based on the subsets of the CV text data includes identifying time codes associated with the subsets of the CV text data, and grouping the subsets of the CV text data having a common theme. Accordingly, the time codes that are used for clip generation do not necessarily need to be based on an entirely contiguous set of time codes. In other words, generation of the video clips may include combining portions of the video at times corresponding to the time codes of grouped subsets of the CV text data.

Figure 10:
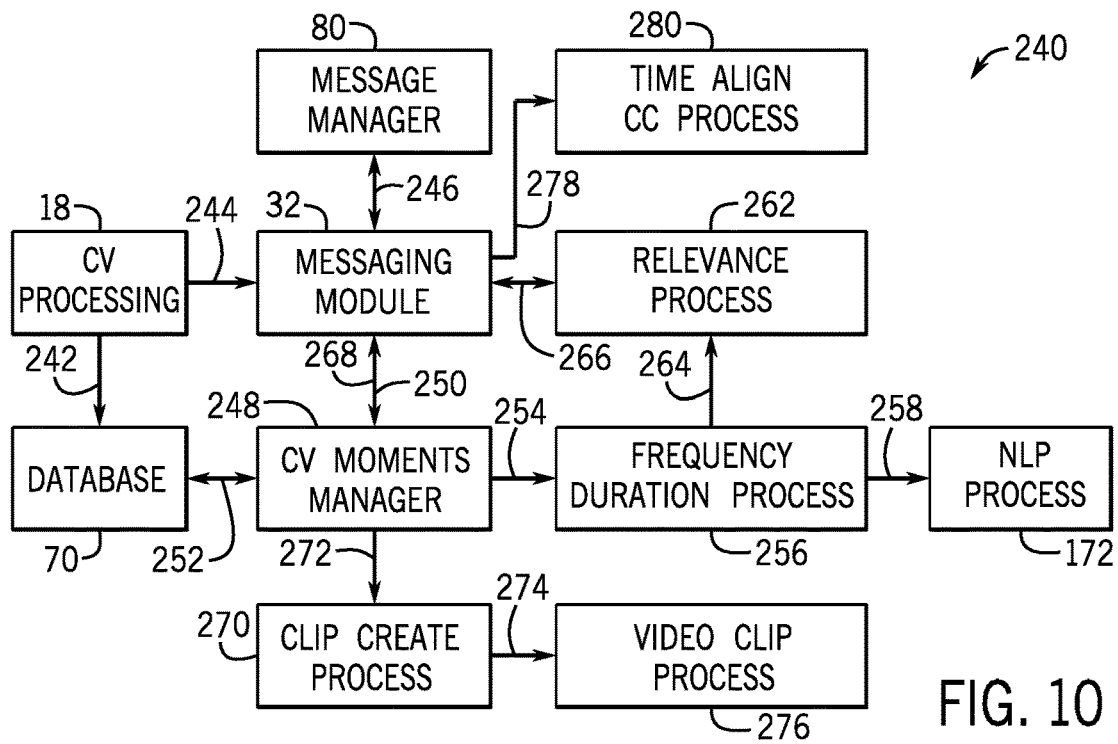
FIG. 10 is a process of generating video clips from CV output data, in accordance with an embodiment of the present disclosure.

FIG. 10 depicts an example process 240 by which various processes and features of the video processing system 20 are coordinated to enable automated clip generation from CV output data generated by the CV processing system 18. As illustrated, at operation 242, CV output data may be entered into the database 70 at operation 242. Once the CV output data has been entered, at operation 244, a computer vision processing completed message is transmitted to the messaging module 32, and the messaging module 32 transmits a communication at operation 246 to start a CV moments manager 248. At operation 250, the CV moments manager 248 is started.

At operation 252, after the CV moments managers 248 is started, the CV moments manager 248 obtains CV output data, which may be timecoded CV text data, from the database 70. Having obtained the CV text data, the CV moments manager 248 calculates frequency and duration of the CV text data at operation 254 according to the frequency and duration process 256. At operation 258, CV output data is sent to NLP text processing 172 to identify potential keywords and themes.

At operation 260, once the NLP process 172 is complete, a relevance process 262 and an additional step 264 is performed to add frequency and/or duration data generated by the frequency and duration process 256 to the relevance process 260. The relevance process 262 may involve analysis of text to determine where significant themes or topics have been identified based on calculated frequency and duration of the CV text.

In an aspect, the relevance process 262 may be considered to represent statistically significant data contained within the CV text data, where statistically significant data is significant from the standpoint of being related or relevant to a theme upon which video clip generation can be based. Once the relevance process 262 is complete the statistically significant text data is selected at operation 266, and the relevance engine data is finalized. As a result, a message is provided from the CV moments manager 248 to the messaging module 32 at operation 268 to indicate that the relevance process 262 is complete.

Once particular text data has been selected, a clip creation process 270 is used to finalize time codes associated with the selected statistically significant CV text data at operation 272. Using these finalized time codes, video clips are generated at operation 274 by a video clip process 276. Matching closed caption text is generated for the duration of each video clip at operation 278 using time align closed caption process 280.

In view of the foregoing, it should be appreciated that video clip generation may be performed using natural language processing in combination with computer vision processing. The two approaches may be combined such that NLP audio processing may be performed in parallel with processing of CV output data to identify significant moments in the video. Accordingly, video clips can be generated in parallel from the audio associated with the video, along with graphics from the video.

Figure 11:
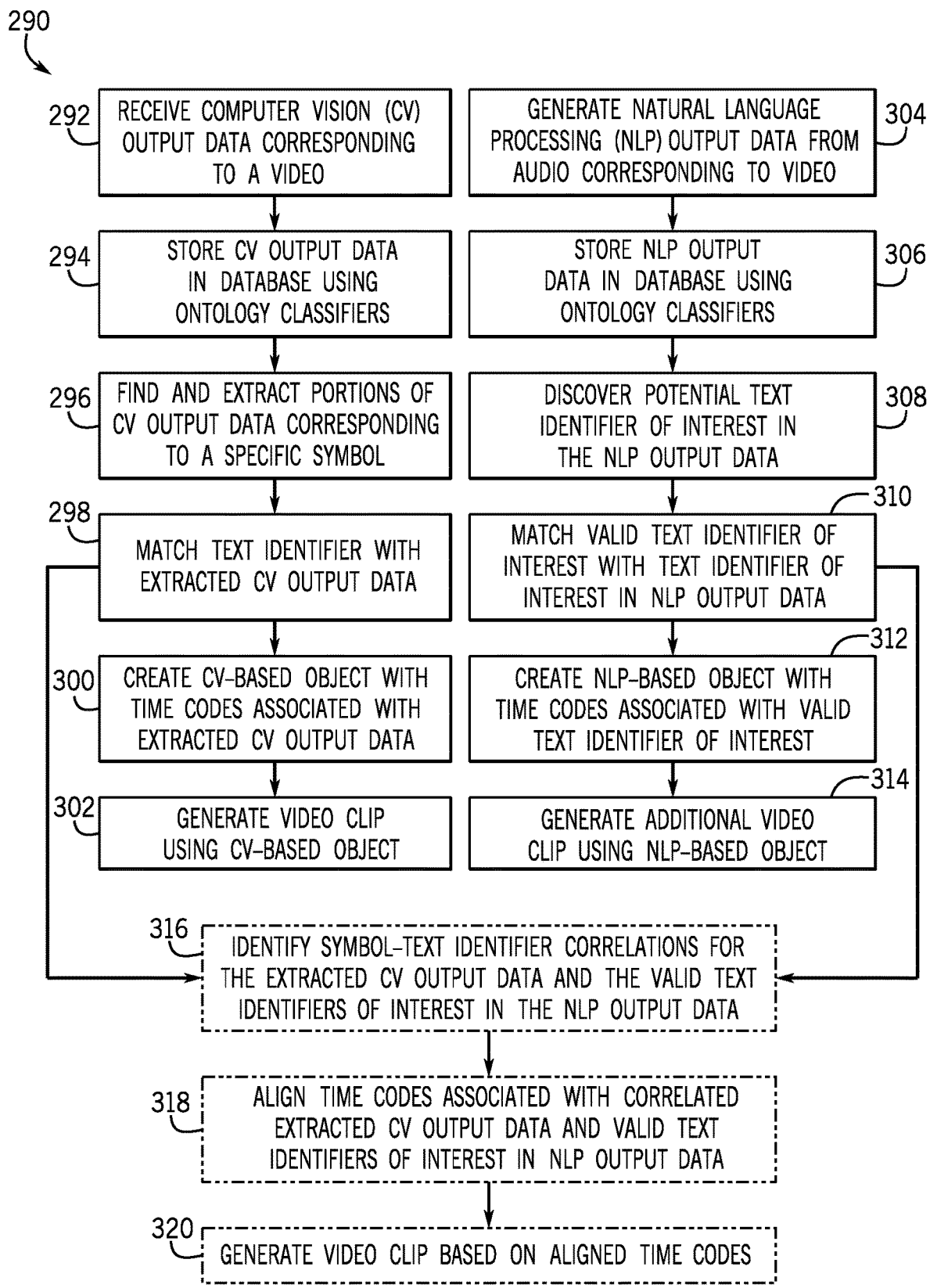
FIG. 11 is a process flow diagram illustrating an embodiment of a method to of generating video clips using CV output data and, in parallel, using NLP audio processing output data, in accordance with an embodiment of the present disclosure.

FIG. 11 is a process flow diagram illustrating an embodiment of a method 290 of generating video clips using CV output data and, in parallel, using NLP audio processing output data. While the CV-based output data and NLP audio processing-based output data may be processed in parallel, either process may be performed before the other, or they may be performed at substantially the same time. Accordingly, while the present discussion focuses first on CV based output data followed by NLP based output data, in an actual implementation the steps to be performed substantially the same time, or at different times in different orders. The CV-based part of the method 290 includes receiving, at operation 292, computer vision output data corresponding to video. As a specific example, the acts represented by operation 292 may include receiving CV output text data generated from a video that includes displayed symbols (e.g., stocks symbols). CV output text data may include OCR text corresponding to symbols in the video, time codes for the OCR text, and ontology classifiers for the OCR text. Thus, the CV output data includes data relating to symbols and other graphical elements that may be presented in the video.

Once the CV output data is generated, the CV output data is stored, at operation 294, in the database 70 using the ontology classifiers associated with data. Storage in the database 70 may be done according to an ontology associated with a particular type of video that was processed. For example, if a show, such as a show related to various stocks is processed, the ontology associated with the stored CV output data would include terms, keywords, and themes associated with such types of information.

Method 290 also includes finding and extracting portions of the CV output data corresponding to a specific symbol, such as a specific stock symbol, in the CV text data based on information located within the ontology, which includes but is not necessarily limited to the ontology classifiers. More specifically, at operation 296, OCR text corresponding to a specific symbol, such as a specific stock symbol, may be found and extracted from the CV output data based on information in the ontology using a regular expression parser configured to identify CV text data representative of symbols associated with a particular theme, such as stock.

Once OCR text corresponding to a specific symbol has been found and extracted, the method 290 includes validating that the OCR text corresponding to a specific symbol actually corresponds a valid symbol. For example, the method 290 may verify that the OCR text corresponding to the specific symbol actually corresponds to valid stock ticker symbol. Thus, as illustrated at operation 298, method 290 may include matching the text identifier, such as a company name, with the extracted CV text, the extracted OCR text corresponding to specific symbol. The text, again, corresponds to a company name or similar identifier relating to symbol. This may include, in certain embodiments, matching a text identifier from a database table of specific symbols or other information associated with particular symbols with the extracted OCR text corresponding to the specific symbol.

Once the extracted OCR text is validated, a CV based object may be created at operation 300, the object having time codes associated with the extracted OCR text corresponding to the specific symbol. At operation 302, a video clip may be generated using the CV based object.

In parallel to the process just described, the method 290 may include generating NLP output data by processing audio associated with the video using NLP and a domain specific language model at operation 304. This may include generating output data that includes keywords, time codes for the keywords, and ontology classifiers for the keywords. In a similar manner as operation 294 associated with the CV-based process, at operation 306 the method 290 includes storing the NLP output data in the database 70 according to an ontology describing the NLP output data using the ontology classifiers. At operation 308, method 290 includes discovering a potential text identifier of interest in the keywords of the NLP output using the ontology. This may represent discovering, for example, a company name that was being discussed during the video, which may also be associated with a stock ticker symbol that was shown at substantially the same time and which may be represented in the CV output data.

To determine whether the potential text identifier of interest is a valid text identifier of interest, a text identifier database is searched for the potential text identifier of interest at operation 310. For example, referring again to the stock example, the potential text identifier of interest may represent a potential company name, and a database of known company names may be searched for the potential company name or stock name.

In response to determining that the potential text identifier of interest is valid, at operation 312, an NLP based object is created with time codes associated with the valid text identifier of interest. This generally represents timecodes corresponding to the timeframe of the video when the valid text identifier of interest (e.g., company name) is discussed during the video. An additional video clip may be generated at step 314 using the NLP based object.

Again, the CV based object identifies time windows that a particular stock ticker appears in the media transmission, while the NLP based object identifies a time window that a particular stock is discussed in the media transmission. It is recognized that there may be correlations that exist between the time windows for the CV text and the NLP based output data. These correlations may be identified to generate further video clips and/or to be used as validation measures to ensure that the video clips being generated are accurate or accurately reflect portions of the video that relate to a particular topic, such as a specific stock.

Accordingly, the method 290 may include step 316, where symbol-text identifier correlations for the extracted CV output data and the valid text identifiers of interest in the NLP output data are identified. As a specific example, operation 316 involves identifying correlations between when the CV output data indicates that a particular stock symbol is being shown with NLP output data that indicates that the stock corresponding to a particular stock symbol is being discussed in the video.

In response to identifying these correlations, at operation 318 time codes associated with the correlated CV output data and valid text identifiers of interest in the NLP output data may be aligned. Alignment in accordance with operation 318 does not necessarily mean that the time codes will have the same start and end time. Rather, the time codes may be aligned in a manner that they overlap, where in certain situations this would correspond a stock being discussed for several seconds before the stock symbol is actually shown in the video. Similarly, the discussion of the particular stock may end before the stock symbol is no longer shown in the video. Once these time codes are aligned, a new object may be created that includes these time codes, and the object may be used to generate video clips based on the object at operation 320.

EXAMPLES

The following actual examples are set forth to provide those of ordinary skill in the art with a description of how the techniques discussed herein may be implemented, and are not intended to limit the scope of the present disclosure. Indeed, the techniques discussed herein may be implemented on other types of video files than those described with respect to FIGS. 12-14.

Example 1

Figure 12:
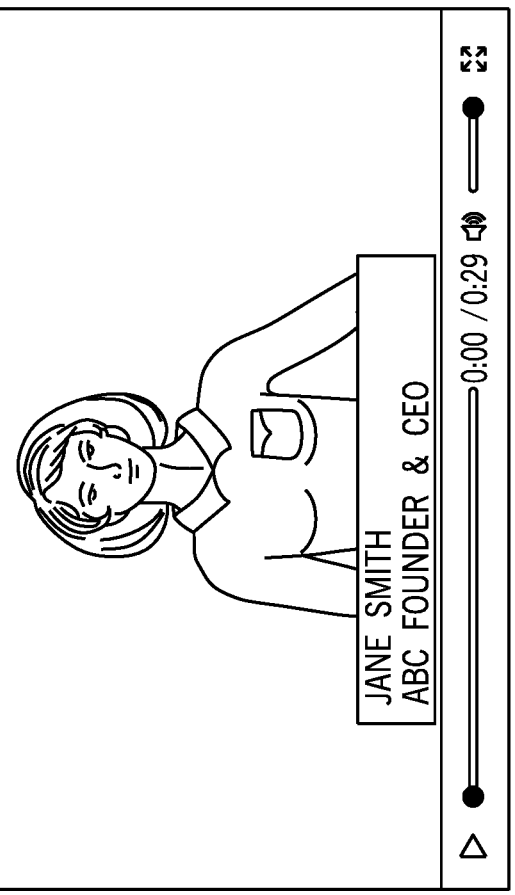
FIG. 12 is an example of a video clip generated by an NLP moments module of the video processing system of FIG. 1, and data associated with the video clip, in accordance with an embodiment of the present disclosure.

FIG. 12 illustrates an example of a video clip generated from a video file relating to money management. The video clip may be generated by the NLP moments module 46 of the present disclosure, for example according to the process 100 of FIG. 4. Specifically, FIG. 12 illustrates a frame 330 from the video clip, data 332 generally describing the clip, and text data 334 associated with the video file, the text data 334 corresponding to the closed caption text of the video clip.

The data 332 describing the video clip describes, among other things, the duration of the video clip, as well as the start and end timecodes for the video clip. As set forth above, the start timecode and end timecode may be determined in a number of ways. In this example, as can be seen with reference to the text data 334, the video clip start timecode is associated with the beginning of a sentence, while the end timecode is not associated with the end of a sentence. Instead, the video clip includes a sentence fragment at the end timecode. This is due to a feature of the clipping algorithm that adds a short amount of time to the end of the video clip to ensure that the theme being discussed is presented in its entirety.

As shown in the text data, words such as "I," "you," and "we" occur at a relatively high frequency, and over a short period of time. Keywords, such as "return," "dividends," "market," and "bullish" are used by the NLP-based video clip algorithm described herein to determine that the text in the video clip has a common theme.

Example 2

FIG. 13 illustrates an example of a video clip generated from a video file relating to politics and tax reform. The video clip may be generated by the CV moments module 48 of the present disclosure, for example according to the process 220 of FIG. 9. FIG. 13 illustrates a frame 340 from the video clip, data 342 about the video clip, and CV text data 344 for the video clip.

The data 342 describing the video clip is generally similar to the data 332 described with respect to EXAMPLE 1. The CV text data 344 in FIG. 13 includes text generated from CV processing of the video file. The CV text data 344 includes "Text," which is either OCR text of graphics shown in the video clip, or a text description of what is behind the graphics. For example, the "Text" column includes entries such as "TAX REFORM: WHO BENEFITS," which is OCR text generated from a graphical element in the video clip. On the other hand, the "Text" column includes entries such as "Politician," or "Man," which corresponds to a person being shown on the clip and, for the purposes of Example 2, is not used by the CV moments module 48.

The CV text data 344 also includes a "Type" column, which may be considered to represent an ontological classifier of each text entry. For example, "TAX REFORM: WHO BENEFITS" is associated with the ontology classifier "LOWERCHANGE," which indicates that the particular text entry was associated with a change in the lower third graphical element of the video clip.

The CV text data 344 further includes start timecodes and end timecodes associated with each text entry. Specifically, the start timecode and end timecode for each text entry describe at what point in time during the video file the particular element is shown, and when it is no longer shown, respectively. Thus, the start timecode and end timecode for each text entry describe the duration for each text entry, and the frequency at which each text entry appears was calculated by the CV moments module 48 over the total duration of the segment of the video file that was processed to generate the video clip. It should be appreciated that because different visual elements may be shown simultaneously during the video clip that the start timecodes and end timecodes are not necessarily contiguous.

Example 3

FIG. 14 illustrates an example of a video clip generated from a video file relating to stocks. The video clip may be generated by the CV moments module 48 of the present disclosure, for example according to the process 290 (specifically, operations 292-302) of FIG. 11. FIG. 14 illustrates a frame 350 from the video clip, data 352 about the video clip, and CV text data 354 for the video clip. The CV text data 352 generally has the same features as the CV text data 342 shown in FIG. 13, and includes OCR text from a stock symbol and OCR text from the stock information shown.

In this example, the CV moments manager 48 generated the video clip entirely based on a single set of text entries associated with a clustered graphic 356, which correspond to a particular stock symbol and its stock information. As shown, the text identifier associated with the stock symbol OCR text (the top/first entry of the CV text data 354) is also associated with a "QTRSTART" ontology classifier, and a duration that lasts nearly 21 seconds. Specifically, the CV moments manager 48 recognized that the particular stock symbol text identifier, as well as other text identifiers associated with it (via the "QTRSTART" ontology classification and start/end timecodes) had a duration that fell within a particular duration range, which initiated the generation of the video clip.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method for generating video clips, comprising:
receiving timecoded computer vision (CV) text data describing graphical elements of a video, wherein the timecoded CV text data comprises optical character recognition (OCR) text of the graphical elements of the video that include text;
calculating a frequency and a duration of terms within the timecoded CV text data;
performing natural language processing (NLP) on the timecoded CV text data to identify keywords and themes contained within the CV text data;
determining which of the keywords and themes identified by the NLP are statistically relevant based on the calculated frequency, the calculated duration, or a combination thereof;
selecting subsets of the CV text data based on the determined statistical relevance;
generating a first video clip based on the subsets of the CV text data;
generating NLP output data by processing audio associated with the video using NLP and a domain specific language model, wherein the NLP output data comprises the keywords in the audio and the time codes associated with the keywords in the audio; and
creating a second video clip based on the time codes associated with the keywords in the NLP processing output data.

2. The method of claim 1, wherein the timecoded CV text data comprises time codes associated with the OCR text or the textual description and an ontology which describes the CV text data or the textual description.

3. The method of claim 1, wherein generating the first video clip based on the subsets of the CV text data comprises:
identifying time codes associated with the subsets of the CV text data;
grouping the subsets of the CV text data having a common theme; and
creating first video clip by combining portions of the video at times corresponding to the timecodes of grouped subsets of the CV text data.

4. The method of claim 1, comprising segmenting the timecoded CV text data into segments that are each representative of a shorter time length than the overall time length of the video.

5. The method of claim 1, wherein the video comprises on-screen elements that correspond to graphical elements displayed on a lower half screen region of a recorded video broadcast.

6. The method of claim 1, wherein the CV text data is received from a computer vision system after the computer vision system has processed the video according to a defined ontology.

7. The method of claim 6, further comprising providing machine learning feedback to the computer vision system, the machine learning feedback comprising information relating to incorrect CV text data, CV text data that is not statistically relevant, or any combination thereof.

8. The method of claim 1, wherein performing NLP on the CV text data to identify keywords and themes contained within the CV text data comprises using an ontology associated with the CV text data, wherein the ontology is configured according to an overall theme of the video to enhance the statistical relevance of identified themes and keywords.

9. A method for generating video clips, comprising:
receiving computer vision (CV) output data generated from a video comprising displayed symbols, wherein the CV output data comprises optical character recognition (OCR) text corresponding to symbols in graphical elements of the video and time codes for the OCR text;

storing the CV output data in a database according to an ontology describing the CV output data using the ontology classifiers;

finding and extracting OCR text corresponding to a specific symbol from the CV output data;

matching a text identifier from a database table with the extracted OCR text corresponding to the specific symbol;

creating a CV-based object with time codes associated with the extracted specific symbol in response to determining that the extracted specific symbol is valid based on the match;

creating a first video clip based on the CV-based object;

generating natural language processing (NLP) output data by processing audio associated with the video using NLP and a domain specific language model, wherein the NLP output data comprises keywords and time codes associated with the keywords;

creating an NLP-based object having time codes associated with a text identifier of interest discovered within the keywords of the NLP processing output data; and creating a second video clip based on the NLP-based object.

10. The method of claim 9, further comprising monitoring a video broadcast using CV to produce the CV output data.

11. The method of claim 9, wherein finding and extracting the specific symbol comprises finding and extracting a specific stock ticker symbol, and wherein matching the text identifier from the database table with the extracted specific symbol comprises looking up a stock name corresponding to the specific stock ticker symbol, and validating the stock name against a stock name database.

12. The method of claim 9, wherein the NLP output data comprises ontology classifiers for the keywords and wherein the method comprises:

storing the NLP output data in the database according to an ontology describing the NLP output data using the ontology classifiers;

discovering a potential text identifier of interest in the keywords of the NLP output using the ontology;

matching a valid text identifier of interest with the potential text identifier of interest by searching a text identifier database for the potential text identifier of interest; and creating the NLP-based object with the time codes associated with the valid text identifier of interest in response to determining that the potential text identifier of interest is valid based on the match.

13. The method of claim 9, wherein the NLP output data is generated independently from a process used to generate the CV output data.

14. The method of claim 9, further comprising monitoring video of a media transmission using CV to produce the CV output data and audio processing audio of the media transmission using NLP to produce the NLP output data in parallel, wherein the CV-based object identifies a first time window that a particular stock ticker appears in the media transmission, and wherein the NLP-based object identifies a second time window that a particular stock is discussed in the media transmission.

15. The method of claim 9, further comprising training the domain specific language model using closed caption data from the video.

16. The method of claim 9, further comprising providing machine learning feedback to a CV system configured to produce the CV output data in response to determining that the OCR of the symbols, or that the ontology classifiers for the OCR of the symbols contains errors, the feedback comprising time codes associated with the errors and correct data for respective time codes associated with the errors.

17. The method of claim 9, wherein the CV output data comprises ontology classifiers for the OCR text, and wherein finding and extracting the OCR text comprises:

finding and extracting the OCR text corresponding to the specific symbol from the CV output data based on at least the ontology classifiers using an expression parser.

18. The method of claim 9, wherein the CV output data includes a textual description of the graphics of the video that lack text.

19. A system for generating video clips, comprising:

a video processing system configured to receive computer vision (CV) output data generated by CV processing of a video and audio associated with the video, wherein the CV output data includes optical character recognition (OCR) text of graphics from the video, a first set of time codes for the OCR text, and a first set of ontology classifiers for the OCR text, and wherein the video processing system comprises:

a natural language processing (NLP) audio processor configured to generate NLP output data from the audio associated with the video using NLP and a domain specific language model, wherein the NLP output data comprises keywords, a second set of time codes associated with the keywords, and a second set of ontology classifiers for the keywords;

a file storage and database system configured to store the video, to store the CV output data according to a first ontology associated with the first set ontology classifiers, and to store the NLP output data according to a second ontology associated with the second set of ontology classifiers;

a CV moments module configured to identify CV-based themes contained in the CV output data using the first set of ontology classifiers, the first ontology, and natural language processing (NLP), and to identify CV-based time codes that are associated with the identified CV-based themes from the first set of time codes;

a natural language processing (NLP) moments module configured to identify NLP-based themes contained in the NLP output data using the second set of ontology classifiers, the second ontology, and NLP, and to identify NLP-based time codes that are associated with the identified NLP-based themes from the second set of time codes; and a video clip generator configured to generate video clips of the video based on the identified CV-based time codes and the identified NLP-based time codes.

20. The system of claim 19, wherein the video processing system comprises a messaging system configured to coordinate CV processing of the video by a CV processing system, retrieval and processing of the CV output data by the CV moments module, NLP of the OCR text by a NLP text processor, and generation of the video clips by the video clip generator.

* * * * *